(12) United States Patent
Lane

(10) Patent No.: US 12,049,326 B2
(45) Date of Patent: Jul. 30, 2024

(54) LIGHTNING STRIKE PROTECTION MATERIAL

(71) Applicant: Airbus Operations Limited, Bristol (GB)

(72) Inventor: Ian Richard Lane, Bristol (GB)

(73) Assignee: Airbus Operations Limited, Bristol (GB)

( * ) Notice: Subject to any disclaimer, the term of this patent is extended or adjusted under 35 U.S.C. 154(b) by 80 days.

(21) Appl. No.: 17/849,792

(22) Filed: Jun. 27, 2022

(65) Prior Publication Data

US 2022/0411098 A1   Dec. 29, 2022

(30) Foreign Application Priority Data

Jun. 29, 2021 (GB) .................................... 2109349

(51) Int. Cl.
| | | |
|---|---|---|
| B64D 45/02 | (2006.01) | |
| B29C 70/28 | (2006.01) | |
| B29K 307/04 | (2006.01) | |
| B29K 309/08 | (2006.01) | |
| B29L 31/30 | (2006.01) | |

(52) U.S. Cl.
CPC .............. *B64D 45/02* (2013.01); *B29C 70/28* (2013.01); *B29K 2307/04* (2013.01); *B29K 2309/08* (2013.01); *B29K 2995/0005* (2013.01); *B29K 2995/0007* (2013.01); *B29L 2031/3076* (2013.01)

(58) Field of Classification Search
CPC .............................. B64D 45/02; B29C 70/28; B26K 2995/0005; B26L 2031/3076; B64C 2001/0054; B64C 2001/0072; H01Q 1/50
USPC ......................................... 361/218, 212, 220
See application file for complete search history.

(56) References Cited

U.S. PATENT DOCUMENTS

| | | | |
|---|---|---|---|
| 2010/0206986 A1 | 8/2010 | Gallant et al. | |
| 2010/0263898 A1* | 10/2010 | Hebert | H02G 13/80 174/2 |
| 2012/0003495 A1* | 1/2012 | Cavaliere | B32B 3/266 428/596 |
| 2017/0214232 A1 | 7/2017 | Aspas et al. | |
| 2018/0257790 A1* | 9/2018 | Rahamat | B23K 26/38 |
| 2019/0037675 A1* | 1/2019 | Sulzbach | H05F 3/00 |
| 2019/0100869 A1 | 4/2019 | Linde et al. | |
| 2021/0371677 A1* | 12/2021 | Parten | B05D 1/02 |

OTHER PUBLICATIONS

British Search Report for Application No. 2109349 dated Nov. 11, 2021.

* cited by examiner

*Primary Examiner* — Danny Nguyen
(74) *Attorney, Agent, or Firm* — KDW Firm PLLC

(57) ABSTRACT

A lightning strike protection material for an aircraft includes an electrically-conductive grid with grid-forming members and nodes where grid-forming members overlap or intersect. A plurality of the grid-forming members and/or nodes include an outward-facing surface, and at least a portion of the outward-facing surface is concave.

25 Claims, 7 Drawing Sheets

LIGHTNING STRIKE PROTECTION MATERIAL

CROSS-REFERENCE TO RELATED APPLICATION

This application claims priority to GB 2109349.7 filed Jun. 29, 2021, the entire disclosure of which is incorporated by reference herein.

TECHNICAL FIELD

The present disclosure relates to lightning strike protection for an aircraft.

The disclosure herein concerns lightning strike protection, optionally for an aircraft. More particularly, but not exclusively, this invention concerns lightning strike protection material for an aircraft. The disclosure herein also concerns a method of making lightning strike protection material, a laminate comprising lightning strike protection material, a method of making a laminate, an aircraft structure comprising lightning strike protection material and a method of making an aircraft structure.

BACKGROUND

Aircraft and tall structures such as wind turbines are vulnerable to lightning strikes. Traditionally, aircraft were made from aluminum, which is conductive and the electrical energy resulting from a lightning strike would be dissipated around the surface of the aircraft and therefore would not usually present a risk to the aircraft. More recently, aircraft and parts thereof (such as radomes, fuselages and wings) have been made from composite materials. Although not always the case, such composite materials are typically electrically insulating. A lightning strike protection material, typically in the form of a sheet of metal grid, is located on an outer surface of the composite material. The lightning strike protection material acts as a sacrificial layer in that it is locally vaporized by a lightning strike, thereby reducing the amount of energy dissipated into the composite material, reducing the risk of the composite material being damaged. In the event that a composite material is damaged, it has to be repaired before the aircraft can resume flying.

The lightning strike protection material is typically covered by one or more layers of paint. If the paint is electrically non-conductive, it has the effect of suppressing the vaporization of the sacrificial lightning strike protection material. This can lead to increased dissipation of energy into the composite material, therefore increasing the risk of the composite material being damaged. As the thickness of the paint increases, the dissipation of energy into the composite material increases and the risk of damage to the composite material increases. It is therefore preferable, from the viewpoint of dissipation of electrical energy from a lightning strike, to use a relatively thin layer of paint. In some circumstances, this may present other problems. An alternative solution is to make the paint conductive by incorporating conductive components into the paint. Incorporating conductive components into the paint may adversely affect some properties of the paint and may be expensive.

The disclosure herein seeks to mitigate the above-mentioned problems. Alternatively or additionally, the disclosure herein seeks to provide an improved lightning strike protection material.

SUMMARY

In accordance with a first aspect of the disclosure herein, there is provided a lightning strike protection material for an aircraft, comprising an electrically-conductive grid comprising a multiplicity of grid-forming members and a multiplicity of nodes where grid-forming members overlap or intersect, wherein a plurality of the grid-forming members and/or nodes comprise an outward-facing surface, and wherein at least a portion of the outward-facing surface is concave.

The lightning strike protection material of the disclosure herein may be lighter than conventional lightning strike protection material, and may provide a higher surface area for dissipation of lightning strikes. Furthermore, and without wishing to be bound by theory, it is suspected that the concave shape of the outward-facing surface focuses the vaporization of metal in the event of a lightning strike so that any overlying layers, such as paint or other coatings, may be ruptured more easily, thereby reducing the likelihood of damage to any underlying composite material.

For the avoidance of doubt, an outward-facing surface is one in which the surface at least partly faces away from the grid.

As indicated above, the nodes are where grid-forming members overlap or intersect. For example, the grid-forming members may comprise a plurality of interwoven wires. In this case, the nodes are formed where wires overlap one another. Alternatively, the grid may comprise an expanded mesh. In this case, nodes are located where grid-forming members formed by the cutting process that forms the mesh intersect.

The grid is optionally flexible. The grid may, in use, be shaped to conform to the surface to which lightning protection is to be provided.

The grid-forming members are optionally elongate. The mean aspect ratio of the grid-forming members may be at least 2:1, optionally at least 3:1, optionally at least 4:1 and optionally at least 5:1. The mean aspect ratio of the grid-forming members may be no more than 20:1, optionally no more than 15:1, optionally no more than 10:1 and optionally no more than 5:1. The aspect ratio of a grid-forming member is the length of the grid-forming member divided by its width. The aspect ratios given above are typical if the grid comprises an expanded mesh.

The mean aspect ratio of the grid-forming members may be at least 50:1, optionally at least 100:1, optionally at least 200:1 and optionally at least 300:1. The mean aspect ratio of the grid-forming members may be no more than 100,000:1, optionally no more than 50,000:1 and optionally no more than 30,000:1. The aspect ratios given above are typical if the grid-forming members comprise interwoven wires.

The mean thickness of the grid-forming members may be at least 0.02 mm, optionally at least 0.04 mm, optionally at least 0.08 mm and optionally at least 0.10 mm. The mean thickness of the grid-forming members may be no more than 0.30 mm, optionally no more than 0.25 mm, optionally no more than 0.20 mm and optionally no more than 0.15 mm. The mean thickness of the grid-forming members may be from 0.02 mm to 0.20 mm and optionally from 0.04 mm to 0.20 mm.

The mean length of the grid-forming members may be at least 0.50 mm, optionally at least 0.75 mm, optionally at least 1.0 mm, optionally at least 1.25 mm, optionally at least 1.50 mm, optionally at least 1.75 mm and optionally at least 2.0 mm. The mean length of the grid-forming members may be no more than 10 mm, optionally no more than 7.5 mm, optionally no more than 5.0 mm, optionally no more than 4.0 mm, optionally no more than 3.0 mm, optionally no more than 2.0 mm and optionally no more than 1.5 mm. The mean length of the grid-forming members may be from 0.50 mm to 10 mm, optionally from 1.0 mm to 5.0 mm and optionally from 1.0 mm to 3.0 mm. The mean lengths given above are optionally typical for grid-forming members in an expanded mesh.

The mean length of the grid-forming members may be at least 0.50 m, optionally at least 0.75 m, optionally at least 1.0 m, optionally at least 1.25 m, optionally at least 1.50 m, optionally at least 1.75 m and optionally at least 2.0 m. The mean length of the grid-forming members may be no more than 10 m, optionally no more than 7.5 m, optionally no more than 5.0 m, optionally no more than 4.0 m, optionally no more than 3.0 m, optionally no more than 2.0 m and optionally no more than 1.5 m. The mean lengths given above are optionally typical for grid comprising interwoven wires.

The mean width of the gird-forming members may be at least 0.05 mm, optionally at least 0.075 mm and optionally at least 0.10 mm. The mean width of the grid-forming members may be no more than 1.0 mm, optionally no more than 0.75 mm, optionally no more than 0.50 mm, optionally no more than 0.40 mm, optionally no more than 0.30 mm, optionally no more than 0.20 mm and optionally no more than 0.10 mm.

The grid may comprise openings having a four-sided shape. For example, the grid may comprise openings having a diamond or square shape.

The size of the grid may be defined by the distance between the centers of adjacent nodes in the mesh. The distance between the centers of adjacent nodes in the mesh may be at least 1.0 mm, optionally at least 1.5 mm, optionally at least 2.0 mm and optionally at least 2.5 mm. The distance between the centers of adjacent nodes in the mesh may be no more than 10.0 mm, optionally no more than 8.0 mm, optionally no more than 6.0 mm, optionally no more than 5.0 mm, optionally no more than 4.0 mm, optionally no more than 3.0 mm and optionally no more than 2.0 mm. The distance between the centers of adjacent nodes in a first direction may be bigger than the distance between the centers of adjacent nodes in a second direction normal to the first direction. The distance between the centers of adjacent nodes in the first direction may be at least 1.0 mm, optionally at least 1.5 mm, optionally at least 2.0 mm and optionally at least 2.5 mm. The distance between the centers of adjacent nodes in the first direction may be no more than 10.0 mm, optionally no more than 8.0 mm, optionally no more than 6.0 mm, optionally no more than 5.0 mm, optionally no more than 4.0 mm, optionally no more than 3.0 mm and optionally no more than 2.0 mm.

The lightning strike prevention material may have a mass per unit area of at least 20 $g/m^2$, optionally at least 30 $g/m^2$, optionally at least 40 $g/m^2$ and optionally at least 50 $g/m^2$. The lightning strike prevention material may have a mass per unit area of no more than 400 $g/m^2$, optionally no more than 300 $g/m^2$ and optionally no more than 200 $g/m^2$. The lightning strike prevention material may have a mass per unit area of from 20 $g/m^2$ to 400 $g/m^2$ and optionally of from 40 $g/m^2$ to 200 $g/m^2$.

The open area of the grid may be at least 30%. The % open area may be calculated as the area of the openings relative to the total area of the grid. The open area may be at least 40%, and optionally may be at least 50%. The open area may be no more than 98%, optionally no more than 95%, optionally no more than 90%, optionally no more than 85% and optionally no more than 80%.

At least one, optionally more than one, optionally the majority of, and optionally each of the grid-forming members may comprise a core provided with an outer coating. For example, the outer coating may be more resistance to corrosion than the core.

The grid may comprise one or more conductive metals. For example, the grid may comprise one or both of copper and aluminum.

The lightning strike protection material need not be limited to use in aircraft. The lightning strike protection material may also be suitable for use in other structures that are susceptible to lightning strikes, such as wind turbines.

The lightning strike protection material may be in the form of a sheet. The sheet may have two faces. A concave outward-facing surface may be located on (and/or form) a face of the sheet.

At least 10% of the grid-forming members and/or nodes (as calculated by number) may comprise at least a portion of an outward-facing surface that is concave. Optionally, at least 20%, optionally at least 30%, optionally at least 40%, optionally at least 50%, optionally at least 60%, optionally at least 70%, optionally at least 80% and optionally at least 90% of the grid-forming members and/or nodes (as calculated by number) comprise at least a portion of an outward-facing surface that is concave.

Optionally, substantially none of the grid forming members or none of the nodes may be provided with at least a portion of an outward facing surface that is concave. For example, none of the nodes may be provided with concave portions, whereas at least some of the grid-forming members may be provided with concave portions. Similarly, none of the grid-forming members may be provided with concave portions, whereas at least some of the nodes may be provided with concave portions. Optionally, at least some of the grid-forming members may be provided with concave portions, and at least some of the nodes may be provided with concave portions.

As mentioned above, grid members and/or nodes are provided with an outer surface (one that faces away from the grid) that is concave. At least 80% of the concave outer surfaces (as calculated by surface area) may face substantially in one direction. At least 90%, optionally at least 95% and optionally at least 98% of the concave outer surfaces (as calculated by surface area) may face substantially in one direction. Optionally, substantially all of the concave outer surfaces (as calculated by surface area) face substantially in one direction.

If the grid comprises a sheet having two faces, at least 80% of the concave outer surfaces may face at least partially away from one face of the sheet. At least 90%, optionally at least 95% and optionally at least 98% of the concave outer surfaces (as calculated by surface area) may face at least partially away from one face of the sheet. Optionally, substantially all of the concave outer surfaces (as calculated by surface area) face at least partially away from one face of the sheet. Such an arrangement facilitates the rupturing of any overlying layers, such as paint or other coatings, in the event of a lightning strike.

If the grid comprises a sheet having two faces, at least 80% of the concave outer surfaces may be located on one face of the sheet. At least 90%, optionally at least 95% and optionally at least 98% of the concave outer surfaces (as calculated by surface area) may be located on one face of the sheet. Optionally, substantially all of the concave outer surfaces (as calculated by surface area) may be located on one face of the sheet. Such an arrangement facilitates the rupturing of any overlying layers, such as paint or other coatings, in the event of a lightning strike.

Optionally, at least 5% of the surface area of the outward-facing surface may be provided by the concave outer surfaces. Optionally at least 10%, optionally at least 20%, optionally at least 30%, optionally at least 40%, optionally at least 50%, optionally at least 60%, optionally at least 70%, optionally at least 80% and optionally at least 90% of the outward-facing surface may be provided by the concave outer surfaces.

The concave surface may be provided in many different ways. For example, the grid-forming members may be concave in cross-section. Such an arrangement may optionally be achieved by drawing wires that are concave in cross-section and arranging those wires into a grid (for example, by weaving those wires), or by stamping the shape into the grid-forming members. A concave surface may be elongate and have the same cross-sectional shape along its length, which cross-sectional shape may be concave. For example, the surface may be V-shaped or U-shaped in cross-section.

Those skilled in the art will realise that different shaped concave surfaces may be used. For example, a concave surface may have a shape consistent with a volume of revolution, such as a conical shape, a bell-shape, a frusto-conical shape or a horn shape (such as a Gabriel's horn shape).

Those skilled in the art will realise that more than one concave shape may be present.

The lightning strike protection material may comprise an indicator to indicate which of the two faces of the lightning strike protection material is provided with concave surfaces. Such an indicator would facilitate the correct orientation of the lightning strike protection material in relation to other components, such as composite material.

In accordance with a second aspect of the disclosure herein, there is provided a laminate for an aircraft structure, the laminate comprising a lightning strike protection material in accordance with the first aspect of the disclosure herein and a composite material. The composite material may optionally comprise a fiber component dispersed in a matrix component. The composite material may comprise more than one layer, each layer comprising a fiber component and a matrix component. The composite material may comprise fiber-reinforced plastic. The fiber component may comprise glass fiber and/or carbon fiber.

The composite material is optionally electrically-insulating.

The lightning strike protection material may contact the composite material.

The laminate may comprise at least one layer of paint overlying the lightning strike protection material. The paint may contact the lightning strike protection material.

The mean thickness of the at least one layer of paint may be at least 50 microns, optionally at least 100 microns, optionally at least 200 microns and optionally at least 300 microns. The lightning strike protection material of the first aspect of the disclosure herein may facilitate the use of thicker overlying paint layers.

In accordance with a third aspect of the disclosure herein, there is provided an aircraft structure comprising a laminate in accordance with the second aspect of the disclosure herein. The aircraft structure may comprise a fuselage or part thereof, a wing or part thereof, a tail or part thereof, a flight control surface (such as a flap, an elevator, an aileron or a rudder) or part thereof, a radome or part thereof, or an engine cowling or part thereof.

In accordance with a fourth aspect of the disclosure herein, there is provided a method of forming a lightning strike protection material according to the first aspect of the disclosure herein, the method comprising:
providing a sheet of blank material; and
forming a grid in accordance with the lightning strike protection material according to the first aspect of the disclosure herein.

Forming a grid may comprise forming a grid substantially without the concave surfaces, and then forming the concave surfaces in the grid.

Alternatively or additionally, formation of the grid may also form the concave surfaces in the grid. For example, the grid may be formed by stamping the sheet of blank material, stamping of the sheet also forming the concave surfaces.

In accordance with a fifth aspect of the disclosure herein, there is provided a method of forming a lightning strike protection material according to the first aspect of the disclosure herein, the method comprising:
providing a multiplicity of grid-forming members, a plurality of the grid-forming members each comprising a concave surface; and
forming a grid from the plurality of grid-forming members.

The method may comprise arranging the plurality of grid-forming members so that the concave surfaces are all on one face of the grid, for example.

In accordance with a sixth aspect of the disclosure herein, there is provided a method of forming a laminate according to the second aspect of the disclosure herein, the method comprising:
contacting un-cured composite material with a lightning strike protection material in accordance with the first aspect of the disclosure herein; and
curing the composite material.

The method may comprise applying paint to cover the lightning strike protection material.

In accordance with a seventh aspect of the disclosure herein, there is provided a method of forming an aircraft structure according to the third aspect of the disclosure herein, the method comprising:
contacting un-cured composite material with a lightning strike protection material in accordance with the first aspect of the disclosure herein, in a mold or former shaped to provide an aircraft structure or part thereof; and
curing the composite material.

In accordance with an eighth aspect of the disclosure herein, there is provided a lightning strike protection material comprising an electrically-conductive sheet in the form of a lattice, the sheet having a first face and a second face, the lattice comprising multiple lattice members and multiple nodes, the nodes being located at the meeting point of lattice members, a plurality of the lattice members comprising a concave surface that faces away from the first face.

The lightning strike protection material of the eighth aspect of the disclosure herein may comprise those features described above in relation to the lightning strike protection material of the first aspect of the disclosure herein.

In accordance with a ninth aspect of the disclosure herein, there is provided an aircraft comprising a lightning strike protection material in accordance with the first aspect of the disclosure herein.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1A:
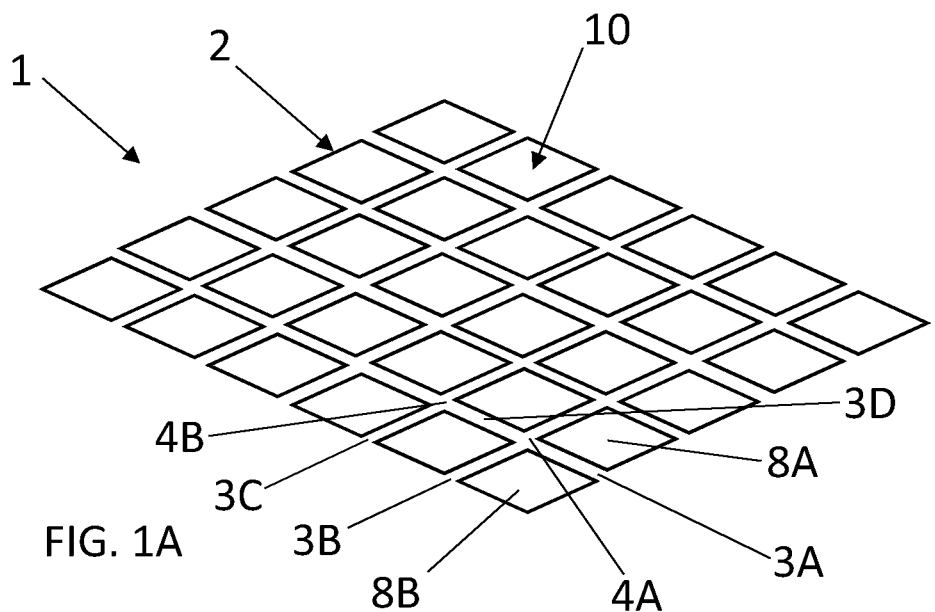
FIG. 1A shows a plan view of an example of a lightning strike protection material according to a first embodiment of the disclosure herein.
Figure 1B:
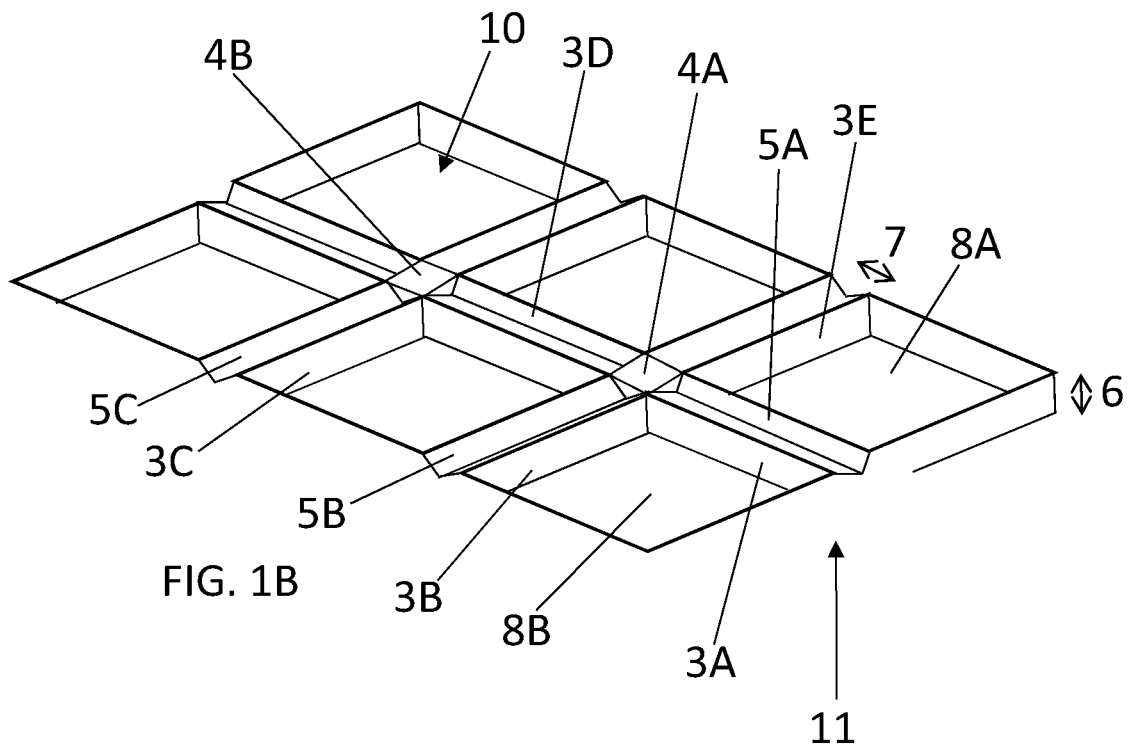
FIG. 1B shows a perspective view of a portion of the lightning strike protection material of FIG. 1A.

An example of a lightning strike protection material according to a first embodiment of the disclosure herein will now be described by way of example only with reference to FIGS. 1A and 1B. The lightning strike protection material is denoted generally by reference numeral 1 and comprises a grid 2 comprising a multiplicity of grid-forming members, a few of which are labelled 3A, 3B, 3C. The grid 2 comprises a multiplicity of nodes, a few of which are labelled 4A, 4B. The nodes 4A, 4B are at the intersection point of grid-forming members. For example, node 4A is at the intersection point of grid-forming members 3A, 3B, 3D, 3E. The grid 2 comprises a plurality of diamond-shaped openings between the grid-forming members. Two of the openings 8A, 8B are labelled. The grid-forming members are provided with an upper surface which is concave. Several of those upper surfaces 5A, 5B are labelled in FIG. 1B. A concave v-shaped notch is formed along the length of each grid-forming member.

The grid 2 is formed from 0.05 mm thick copper foil. The length of each grid-forming member is about 1.4 mm. The thickness 6 of the grid is about 0.15 mm. The width 7 of each grid-forming member is about 0.1 mm. The grid has an open area of about 80% i.e. the area of the openings is about 80% of the total area of the grid (the sum of the area of the openings and the area of the grid-forming members and nodes). The lightning strike protection material 1 has an area weight of about 75 g/m$^2$.

Figure 6:
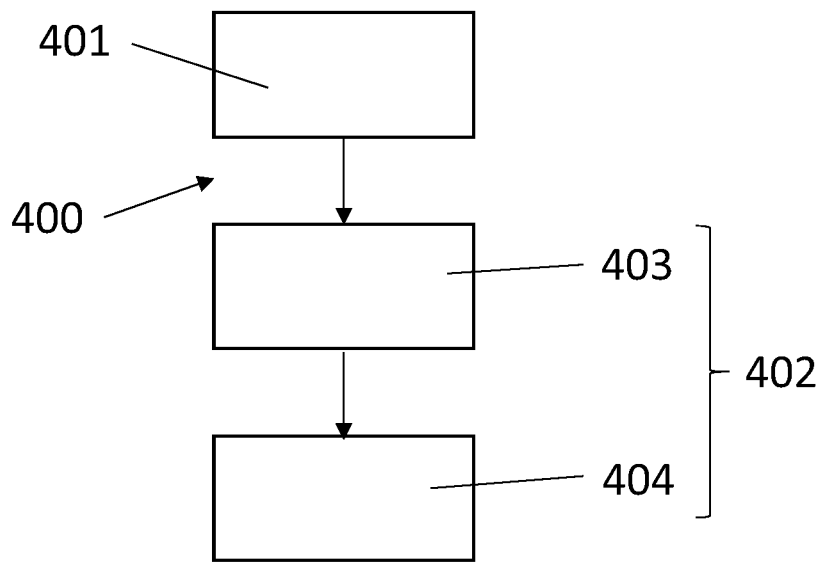
FIG. 6 shows a schematic of an example of a method of making a lightning strike protection material according to an embodiment of the disclosure herein.

A method of making the lightning strike protection material of FIGS. 1A and 1B will now be described with reference to FIG. 6. The method is denoted generally by reference numeral 400, and comprises providing 401 a sheet of blank material, in this case a sheet of 0.05 mm thick copper foil. The method comprises forming 402 the grid 2 from the copper foil by stamping the copper foil. The stamping process cuts the copper foil in the appropriate places so that the cut foil can be pulled to form the grid. The stamping process also forms the concave surfaces on the upper surface 5A, 5B of the grid-forming members.

Alternatively, forming 402 a grid may comprise forming 403 a grid substantially without the concave surfaces, and then forming 404 the concave surfaces in the grid.

Figure 4:
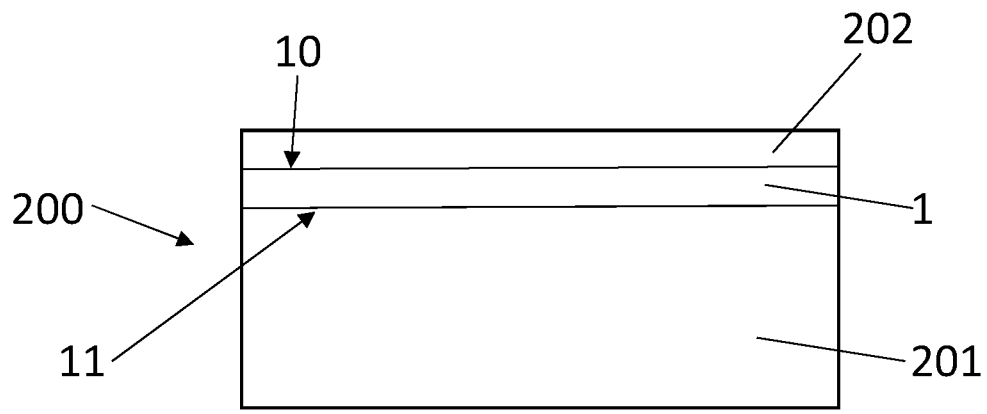
FIG. 4 shows a schematic cross-sectional view of an example of a laminate according to an embodiment of the disclosure herein.

The lightning strike protection material 1 may be incorporated into a laminate material to protect underlying composite material from the effects of a lightning strike. In this connection, FIG. 4 shows a schematic cross-sectional view through an example of a laminate in accordance with an embodiment of the disclosure herein. The laminate is denoted generally by reference numeral 200 and comprises lightning strike protection material 1 in contact with an underlying composite material 201. The underlying composite material 201 comprises a plurality of layers of electrically non-conductive composite. Such composite material comprises a fiber component dispersed in a binding matrix. A layer of paint 202 covers the lightning strike protection material 1. The paint is approximately 0.2 mm thick and is of the type that is usually applied to the surface of a commercial passenger aircraft. Referring to FIGS. 1A and 1B, lightning strike protection material 1 is in the form of a sheet and has a first face 10 and a second face 11. Lightning strike protection material 1 is arranged so that the first face 10 and upper concave surfaces 5A, 5B face outwards towards the paint 202. The thicknesses of the lightning strike protection material 1 and paint 202 have been exaggerated in FIG. 4 for clarity.

In the event of a lightning strike, the lightning strike protection material in the vicinity of the lightning strike will typically evaporate, with the resultant gases rupturing the paint. Furthermore, and without wishing to be bound by theory, the concave shape provides a greater surface area from which the metal grid of the lightning strike protection material evaporates in the event of a lightning strike.

The sacrificial destruction of a portion of lightning strike protection material is a high-energy event in so far as there is sufficient energy to locally destroy the lightning strike protection material. Without wishing to be bound by theory, it is anticipated that providing the lightning strike protection material with a concave surface will focus the vaporization of the lightning strike protection material in a similar manner to the focusing of an explosion by a concave surface using the Munroe effect. By focusing the vaporization, the overlying paint may be ruptured more easily than when using a conventionally-shaped lightning strike protection material.

Figure 8:
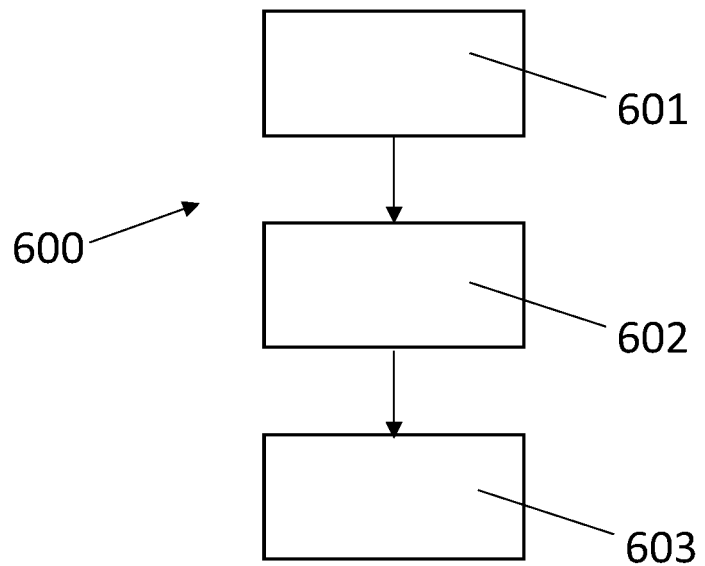
FIG. 8 shows a schematic of an example of a method of making a laminate according to an embodiment of the disclosure herein.

A method of making the laminate of FIG. 4 will now be described with reference to FIG. 8. The method is denoted generally by reference numeral 600 and comprises contacting 601 un-cured composite material with lightning strike protection material 1 and curing 602 the composite material. This is typically achieved by providing a mold that is to shape the composite material. The lightning strike protection material 1 is placed into the bottom of the mold, with the first face 10 and the concave surfaces 5A, 5B facing the mold surface. Un-cured composite material is then introduced into the mold, and pressure and heat are applied to the composite material in the mold to cure the composite material. The cured composite material, along with the lightning strike protection material 1 are removed from the mold. A layer of paint is then applied 603 to the lightning strike protection material.

Figure 5:
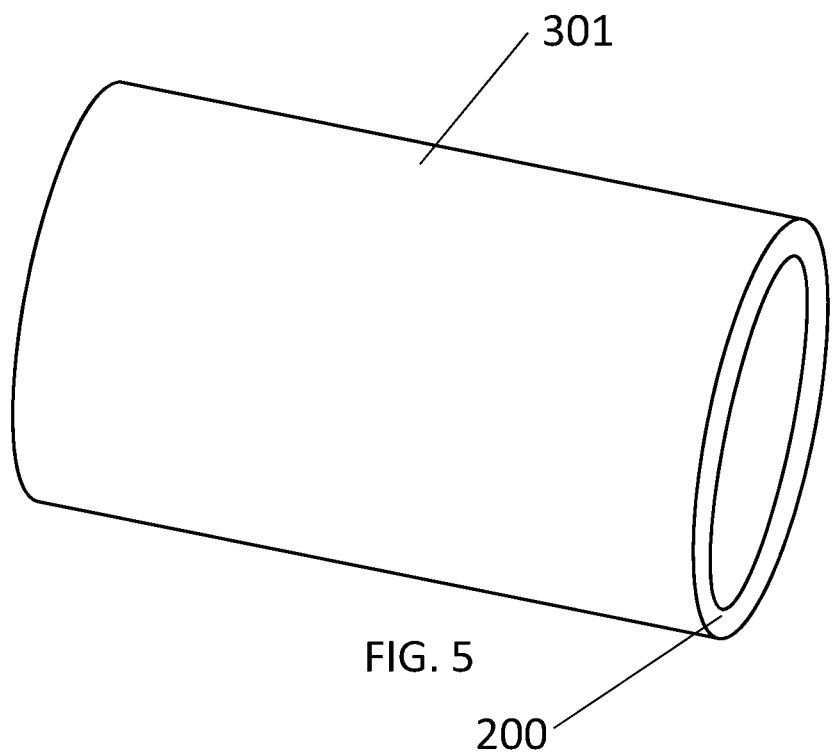
FIG. 5 shows a schematic perspective view of an example of a portion of aircraft fuselage according to an embodiment of the disclosure herein.
Figure 9:
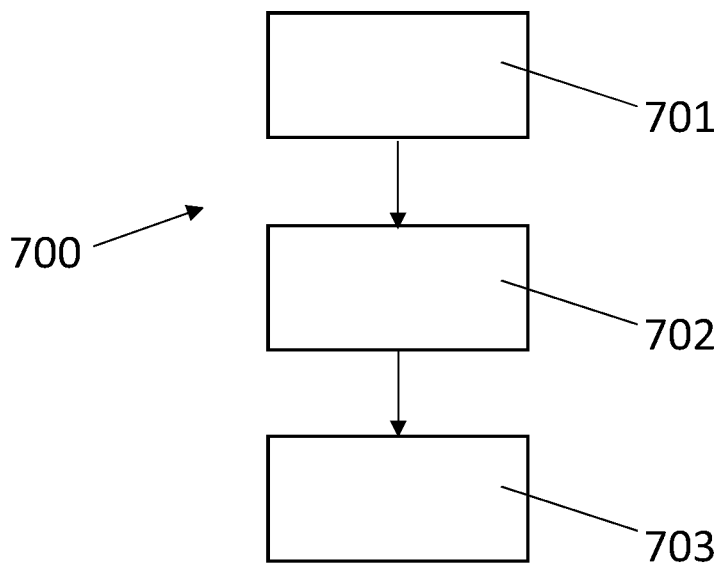
FIG. 9 shows a schematic of an example of a method of making an aircraft component according to an embodiment of the disclosure herein.
Figure 10:
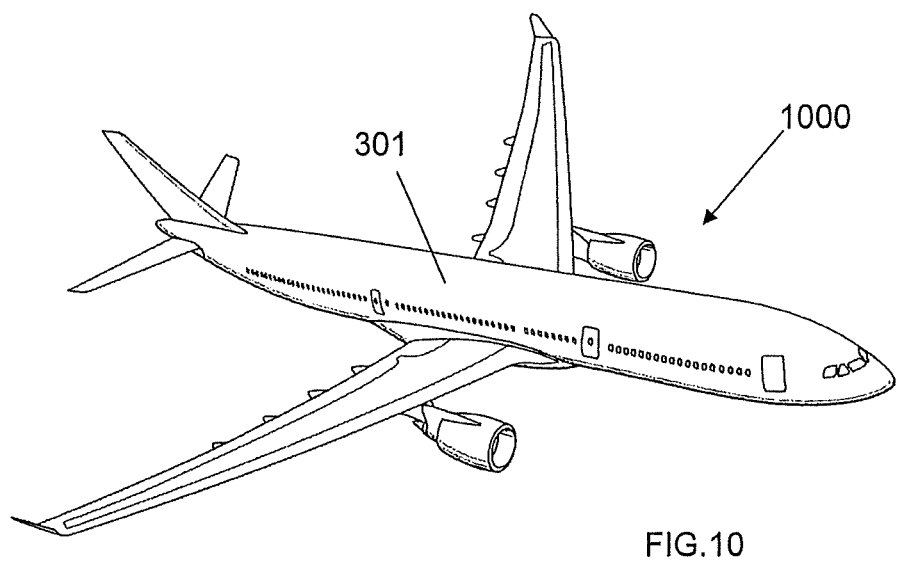
FIG. 10 shows a schematic perspective view of an example of an aircraft according to an embodiment of the disclosure herein.

The method described above in relation to FIGS. 4 and 8 may be used to make an aircraft structure or part thereof, as will now be described with reference to FIG. 9. The method is denoted generally by reference numeral 700 and comprises contacting 701 un-cured composite material with lightning strike protection material 1, and curing 702 the composite material. This is typically achieved by providing a mold that is to shape the composite material into the desired shape of the aircraft structure or part thereof. The lightning strike protection material 1 is placed into the bottom of the mold, with the first face 10 and the concave surfaces 5A, 5B facing the mold surface. Un-cured composite material is then introduced into the mold, and pressure and heat are applied to the composite material in the mold to cure the composite material. The cured composite material, along with the lightning strike protection material 1 are removed from the mold. A layer of paint is then applied 703 to the lightning strike protection material. FIG. 5 shows a schematic perspective view of part of an aircraft fuselage 301 comprising laminate 200 and made using the method as described above in relation to FIG. 9. FIG. 10 shows an aircraft 1000 comprising the part of an aircraft fuselage 301.

Figure 2A:
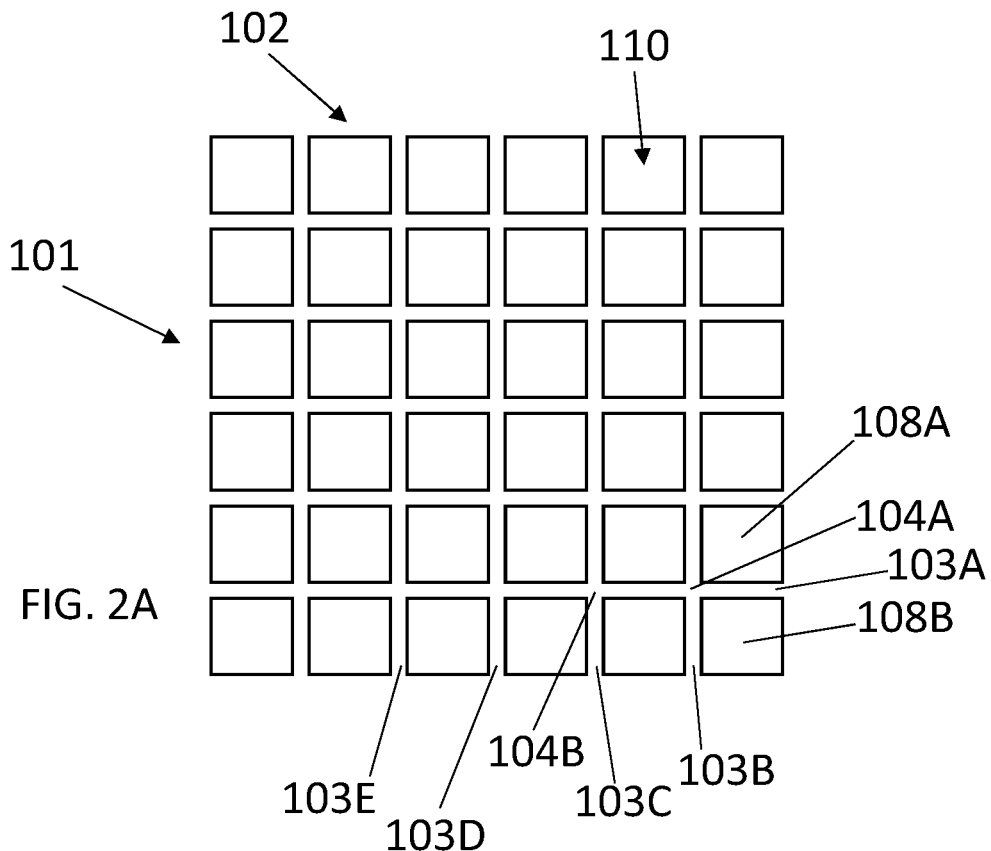
FIG. 2A shows a plan view of a further example of a lightning strike protection material according to another embodiment of the disclosure herein.
Figure 2B:
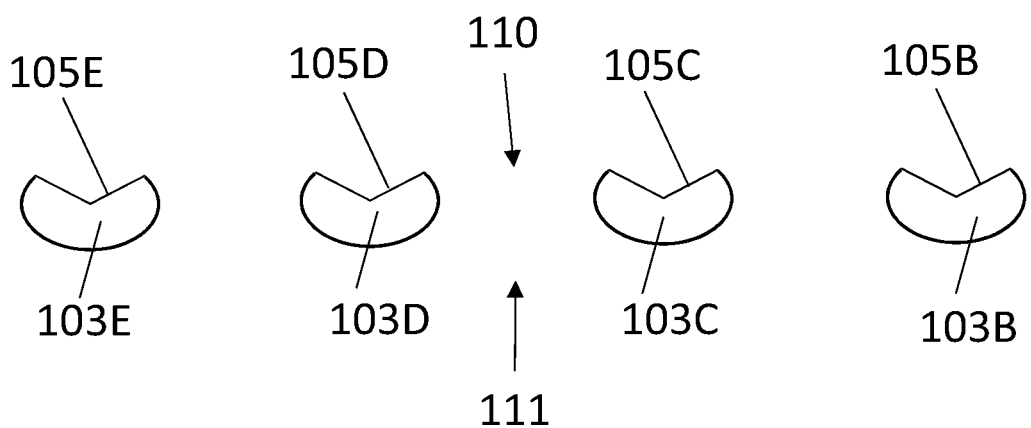
FIG. 2B shows a schematic side-on view of a portion of the lightning strike protection material shown in FIG. 2A.

A further example of a lightning strike protection material according an embodiment of the disclosure herein will now be described with reference to FIGS. 2A and 2B. The lightning strike protection material is denoted generally by reference numeral 101 and comprises a grid 102. The grid 102 comprises a multiplicity of grid-forming members, some of which are labelled 103A, 103B, 103C, 103D, 103E. In this case, the grid-forming members comprise bronze wires that are interwoven to form a grid structure. The grid comprises a multiplicity of nodes 104A, 104B that are formed where the wires overlap. For example, node 104A is formed where wires 103A and 103B overlap, and node 104B is formed where wires 103A and 103C overlap. Each of the wires 103A, 103B, 103C, 103D, 103E is generally oval in cross-section, with a concave v-shaped surface 105B, 105C, 105D, 105E facing outwards from a first face 110 of the grid 102 (the grid having a first face 110 and a second face 111). The concave v-shaped surface may be formed by drawing the wire to have such a shape. The grid 102 comprises square openings, only some of which 108A, 108B are labelled.

Each wire has a diameter of about 0.08 mm, and the mesh size is about a 1.0 mm square. The open area is about 85%, with an area weight of about 80 g/m².

Figure 7:
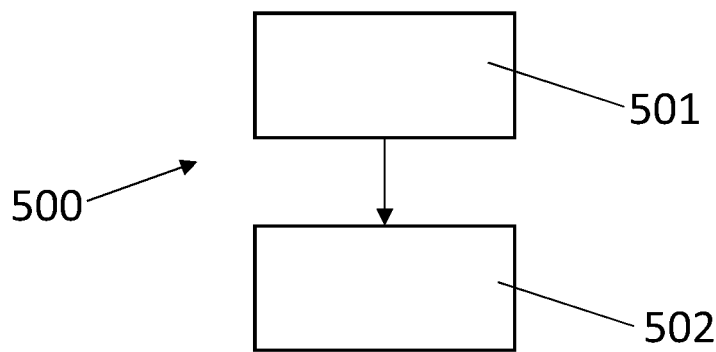
FIG. 7 shows a schematic of an example of a further method of making a lightning strike protection material according to a further embodiment of the disclosure herein.

A method of making the lightning strike protection material 101 will now be described with reference to FIG. 7. The method of forming a lightning strike protection material is denoted generally by reference numeral 500. The method 500 comprises providing 501 a multiplicity of grid-forming members, a plurality of the grid-forming members each comprising a concave surface, and forming 502 a grid from the plurality of grid-forming members. In this case, the grid-forming members are brass wires of about 0.08 mm diameter that have been drawn to provide a concave surface such as that shown in FIG. 2B. The wires are woven into a grid, the wires being arranged such that all of the concave surfaces face in substantially the same direction.

The lightning strike protection material 101 may be used in substantially the same way as lightning strike protection material 1 described above.

Figure 3:
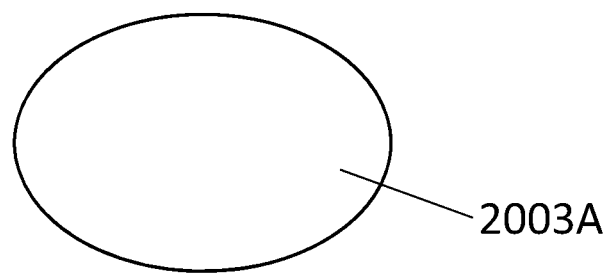
FIG. 3 shows cross-sectional views of examples of wires for use in a lightning strike protection material according to an embodiment of the disclosure herein.
Figure 3:
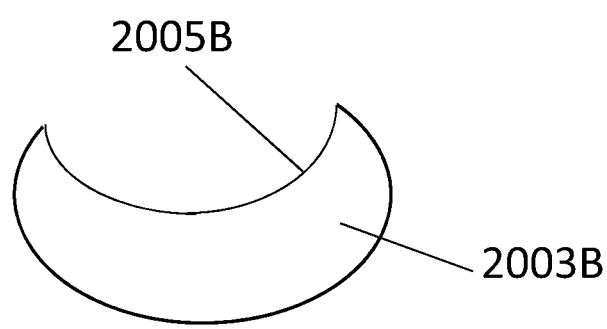
Figure 3:
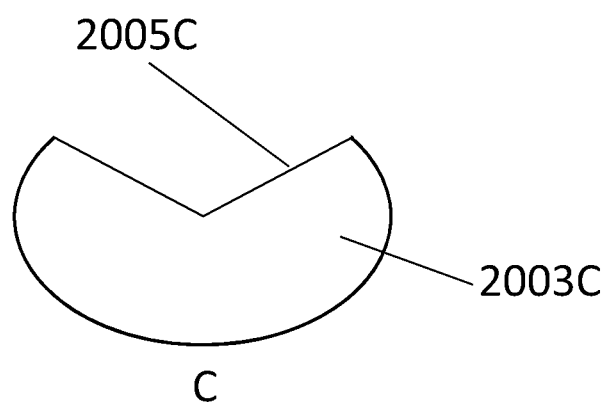

FIG. 3 shows a cross-sectional view through three wires that may be used in lightning strike protection materials. Wire A is a prior art wire that is generally oval in cross-section. Wire B is crescent-shaped in cross-section, and wire C is Pacman-shaped in cross-section.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

The examples above describe how lightning strike protection material may be used on aircraft. Those skilled in the art will realise that the lightning strike protection material in accordance with the disclosure herein may be used with structures other than aircraft, such as wind turbines.

The examples above describe grid-forming members that are concave in cross-section along the length of the grid-forming member. Those skilled in the art will realise that other arrangements may be possible. For example, the concave surface may be in the shape of a surface of revolution, such as conical surface, a frusto-conical surface or a horn-shaped surface, such as a surface in the shape of Gabriel's Horn. A plurality of such surfaces of revolution may be provided along a grid-forming member, for example. The concave surface may be in the form of an indentation, for example, which may have any suitable shape.

The examples above describe grids in which all grid-forming members are provided with concave surfaces. This need not be the case, of course.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A lightning strike protection material for an aircraft, the lightning strike protection material comprising:
   an electrically-conductive grid comprising:
      grid-forming members; and
      nodes, which are formed where grid-forming members overlap or intersect each other;
      wherein a plurality of the grid-forming members each comprise an outward-facing surface that is at least partially a concave; and/or
      wherein a plurality of the nodes each comprise an outward-facing surface that is at least partially concave.

2. The lightning strike protection material according to claim 1, wherein the grid is flexible.

3. The lightning strike protection material according to claim 1, wherein:
   the grid-forming members are elongate and have a mean aspect ratio of at least 3:1 and no more than 20:1; and
   the grid comprises an expanded mesh.

4. The lightning strike protection material according to claim 1, wherein the grid-forming members;
   are elongate;
   have a mean aspect ratio of at least 50:1 and no more than 30,000:1; and
   comprise interwoven wires.

5. The lightning strike protection material according to claim 1, wherein the grid-forming members have a mean thickness of at least 0.02 mm and no more than 0.30 mm.

6. The lightning strike protection material according to claim 1, wherein the grid comprises openings having a four-sided shape.

7. The lightning strike protection material according to claim 1, wherein a distance between centers of adjacent nodes in the grid is at least 1.0 mm and is no more than 10.0 mm.

8. The lightning strike protection material according to claim 1, wherein the lightning strike protection material has a mass per unit area of at least 20 g/m² and no more than 400 g/m².

9. The lightning strike protection material according to claim 1, wherein the grid has an open area of at least 30% and no more than 95%.

10. The lightning strike protection material according to claim 1, wherein, as calculated by number, at least 10% of the grid-forming members and/or nodes have the outward-facing surface that is at least partially concave.

11. The lightning strike protection material according to claim 1, wherein:
    substantially none of the grid forming members have the outward-facing surface that is at least partially concave; or
    none of the nodes have the outward-facing surface that is at least partially concave.

12. The lightning strike protection material according to claim 1, wherein at least 80% of the at least partially concave outward-facing surfaces, as calculated by surface area, face substantially in one direction.

13. The lightning strike protection material according to claim 1, wherein:
    the grid comprises a sheet having two faces; and
    at least 80% of the at least partially concave outward-facing surfaces face at least partially away from one of the two faces of the sheet.

14. The lightning strike protection material according to claim 1, wherein:
    the grid comprises a sheet having two faces; and
    at least 80% of the at least partially concave outward-facing surfaces are on one of the two faces of the sheet.

15. The lightning strike protection material according to claim 1, wherein at least one of the at least partially concave outwardly-facing surfaces is elongate and has a same cross-sectional shape along a length thereof, which cross-sectional shape is concave.

16. The lightning strike protection material according to claim 1, wherein at least one of the at least partially concave outwardly-facing surfaces has a shape consistent with a volume of revolution and/or has a conical shape, a bell-shape, a frusto-conical shape, or a horn shape.

17. The lightning strike protection material according to claim 1, comprising an indicator to indicate which of two faces of the lightning strike protection material comprises the at least partially concave outward-facing surfaces.

18. A laminate for an aircraft structure, the laminate comprising:
    the lightning strike protection material according to claim 1;
    a composite material; and
    at least one layer of paint overlying the lightning strike protection material.

19. An aircraft structure comprising:
    the laminate according to claim 18; and
    a fuselage or part thereof, a wing or part thereof, a tail or part thereof, a flight control surface or part thereof, a flap or part thereof, an elevator or part thereof, an aileron or part thereof, a rudder or part thereof, a radome or part thereof, or an engine cowling or part thereof.

20. A method of forming a lightning strike protection material, the method comprising:
    providing a sheet of blank material; and
    forming a grid in accordance with the lightning strike protection material according to claim 1.

21. A method of forming the lightning strike protection material according to claim 1, the method comprising:
    providing a multiplicity of grid-forming members, a plurality of the grid-forming members each comprising a concave surface; and
    forming a grid from the plurality of grid-forming members.

22. A method of forming the laminate according to claim 18, the method comprising:
    contacting un-cured composite material with the lightning strike protection material; and
    curing the composite material.

23. A method of forming the aircraft structure according to claim 19, the method comprising:
    contacting un-cured composite material with the lightning strike protection material, in a mold or former shaped to provide the aircraft structure or part thereof; and
    curing the composite material.

24. A lightning strike protection material comprising:
    an electrically-conductive sheet that has a first face and a second face;
    wherein the sheet is in a form of a lattice that comprises multiple lattice members and multiple nodes;
    wherein the nodes are located at respective meeting points of the lattice members; and
    wherein a plurality of the lattice members have a concave surface that faces away from the first face.

25. An aircraft comprising the lightning strike protection material according to claim 1.

* * * * *